US011509215B2

United States Patent
Hiasa (10) Patent No.: US 11,509,215 B2
(45) Date of Patent: Nov. 22, 2022

(54) POWER CONTROL APPARATUS AND POWER CONTROL METHOD WITH OSCILLATION CONTROL

(71) Applicant: FUJI ELECTRIC CO., LTD., Kanagawa (JP)

(72) Inventor: Nobuyuki Hiasa, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 114 days.

(21) Appl. No.: 17/001,661

(22) Filed: Aug. 24, 2020

(65) Prior Publication Data

US 2020/0389089 A1 Dec. 10, 2020

Related U.S. Application Data

(63) Continuation of application No. PCT/JP2019/029245, filed on Jul. 25, 2019.

(30) Foreign Application Priority Data

Sep. 27, 2018 (JP) .............................. JP2018-181488

(51) Int. Cl.
*H02M 3/156* (2006.01)
*H02M 1/42* (2007.01)
*H02M 7/217* (2006.01)

(52) U.S. Cl.
CPC ......... *H02M 3/156* (2013.01); *H02M 1/4225* (2013.01); *H02M 7/217* (2013.01)

(58) Field of Classification Search
None
See application file for complete search history.

(56) References Cited

U.S. PATENT DOCUMENTS 8,116,045 B2 * 2/2012 Young .................. H02M 3/155
361/18
8,253,404 B2 * 8/2012 Yoshii ................ H03F 3/45475
323/299

(Continued)

FOREIGN PATENT DOCUMENTS

JP     2000116134 A    4/2000
JP     2008199896 A    8/2008
(Continued)

OTHER PUBLICATIONS

Current continuous mode control power factor improvement IC, p. 15, online, Accessed Feb. 13, 2018, URL: https://felib.fujielectric.co.jp/download/details.htm?dataid=1734586&site=japan&lang=ja.

(Continued)

*Primary Examiner* — Jeffrey A Gblende (57) ABSTRACT

Recently, it is desired to improve responsiveness in case where a drop in the output voltage is prevented. A power supply control device is provided, comprising a switch control unit for controlling an ON/OFF state of a switching device of a boosting chopper using an oscillation wave, a voltage acquisition unit for acquiring DC output voltage corresponding to an output of the boosting chopper, and an oscillation control unit for reducing a change speed of the oscillation wave during at least a part of a period during which the switching device is in an ON state, in response to a drop in the DC output voltage.

17 Claims, 7 Drawing Sheets

(56) References Cited

U.S. PATENT DOCUMENTS

| | | | | |
|---|---|---|---|---|
| 8,912,776 B2* | 12/2014 | Qian | ................... | H02M 3/156 |
| | | | | 323/282 |
| 9,641,779 B2* | 5/2017 | Aibara | ................... | H04N 5/378 |
| 10,778,231 B2* | 9/2020 | Tseng | ................... | H03K 3/037 |
| 2006/0061337 A1 | 3/2006 | Kim | | |
| 2010/0225292 A1 | 9/2010 | Nishimori | | |
| 2010/0302808 A1 | 12/2010 | Uemura | | |
| 2011/0122664 A1 | 5/2011 | Yabuzaki | | |
| 2012/0091970 A1 | 4/2012 | Cho | | |
| 2014/0055115 A1* | 2/2014 | Raval | ................... | H02M 3/156 |
| | | | | 323/288 |

FOREIGN PATENT DOCUMENTS

| | | | |
|---|---|---|---|
| JP | 2010207022 | A | 9/2010 |
| JP | 2010279190 | A | 12/2010 |
| JP | 2011135759 | A | 7/2011 |
| JP | 2012090515 | A | 5/2012 |

OTHER PUBLICATIONS

International Search Report and (ISA/237) Written Opinion of the International Search Authority for International Patent Application No. PCT/JP2019/029245, mailed by the Japan Patent Office dated Oct. 15, 2019.

* cited by examiner

POWER CONTROL APPARATUS AND POWER CONTROL METHOD WITH OSCILLATION CONTROL

The contents of the following Japanese patent application are incorporated herein by reference:
 2018-181488 filed in JP on Sep. 27, 2018
 PCT/JP2019/029245 filed on Jul. 25, 2019

BACKGROUND

1. Technical Field

The present invention relates to a power supply control device and a power supply control method.

2. Related Art

Traditionally, various technologies for power supply devices using a boosting chopper have been proposed to prevent a drop in output voltage in case where a load suddenly increases or the like (See Patent Document 1, 2, Non-Patent Document 1, for example).
Patent Document 1: Japanese Unexamined Patent Application, Publication No. 2010-279190
Patent Document 2: Japanese Unexamined Patent Application, Publication No. 2000-116134
Non-Patent Document 1: "Current continuous mode control power factor improvement IC" 15/30 page, [online], [Accessed Feb. 13, 2018], internet <URL: https://felib.fujielectric.co.jp/download/details.htm?dataid=1734586&site=japan&lang=ja>

Recently, it is desired to further increase the responsiveness in case where a drop in the output voltage is prevented.

SUMMARY

In order to solve the aforementioned problem, a first aspect of the present invention provides a power supply control device. The power supply control device may include a switch control unit for controlling an ON/OFF state of a switching device of a boosting chopper using an oscillation wave. The power supply control device may include a voltage acquisition unit for acquiring DC output voltage corresponding to an output of the boosting chopper. The power supply control device may include an oscillation control unit for reducing a change speed of the oscillation wave during at least a part of a period during which the switching device is in an ON state, in response to a drop in the DC output voltage.

The oscillation control unit may gradually decrease the change speed of the oscillation wave during at least a part of a period during which the switching device is in an ON state, as the DC output voltage drops.

The switch control unit may control an ON/OFF state of the switching device using a ramp wave as the oscillation wave. The oscillation control unit may reduce an inclination of the ramp wave during at least a part of a period during which the switching device is in an ON state, in response to a drop in the DC output voltage.

The power supply control device may further include an operation control unit for maintaining the oscillation control unit in an enabled state in response to the DC output voltage exceeding a threshold voltage.

The power supply control device may further include an oscillator for generating the oscillation wave. The oscillator may have a capacitor. The oscillator may have a charge and discharge circuit for charging and discharging the capacitor. The oscillation control unit may reduce a charge current supplied to the capacitor by the charge and discharge circuit, in response to a drop in the DC output voltage.

The oscillation control unit may have a current output amplifier for reducing a current corresponding to a difference between a reference voltage and a detection voltage obtained by detecting the DC output voltage from the charge current.

The current output amplifier may reduce a current that varies according to the size of a difference between the reference voltage and the detection voltage from the charge current.

The current output amplifier may not change the charge current in case where the detection voltage is equal to or higher than the reference voltage, and may reduce a current that varies according to the size of a difference between the reference voltage and the detection voltage from the charge current in case where the detection voltage is lower than the reference voltage.

The current output amplifier may provide hysteresis between the reference voltage used in case where the detection voltage is equal to or higher than the reference voltage and the reference voltage used in case where the detection voltage is lower than the reference voltage.

The power supply control device may further include a trigger unit for switching the switching device to an ON state in response to a current flowing to the boosting chopper becoming lower than the reference current.

In a second aspect of the present invention, a power supply control method is provided. The power supply control method may include controlling an ON/OFF state of a switching device of a boosting chopper using an oscillation wave. The power supply control method may include acquiring a DC output voltage corresponding to an output the boosting chopper. The power supply control method may include controlling oscillation to reduce a change speed of the oscillation wave during at least a part of a period during which the switching device is in an ON state, in response to a drop in the DC output voltage.

The summary clause does not necessarily describe all necessary features of the embodiments of the present invention. The present invention may also be a sub-combination of the features described above.

DESCRIPTION OF EXEMPLARY EMBODIMENTS

Hereinbelow, the present invention will be described through embodiments of the invention, but the following embodiments do not limit the invention according to the claims. In addition, not all combinations of features described in the embodiments are necessarily essential to the solution of the invention.

Figure 1:
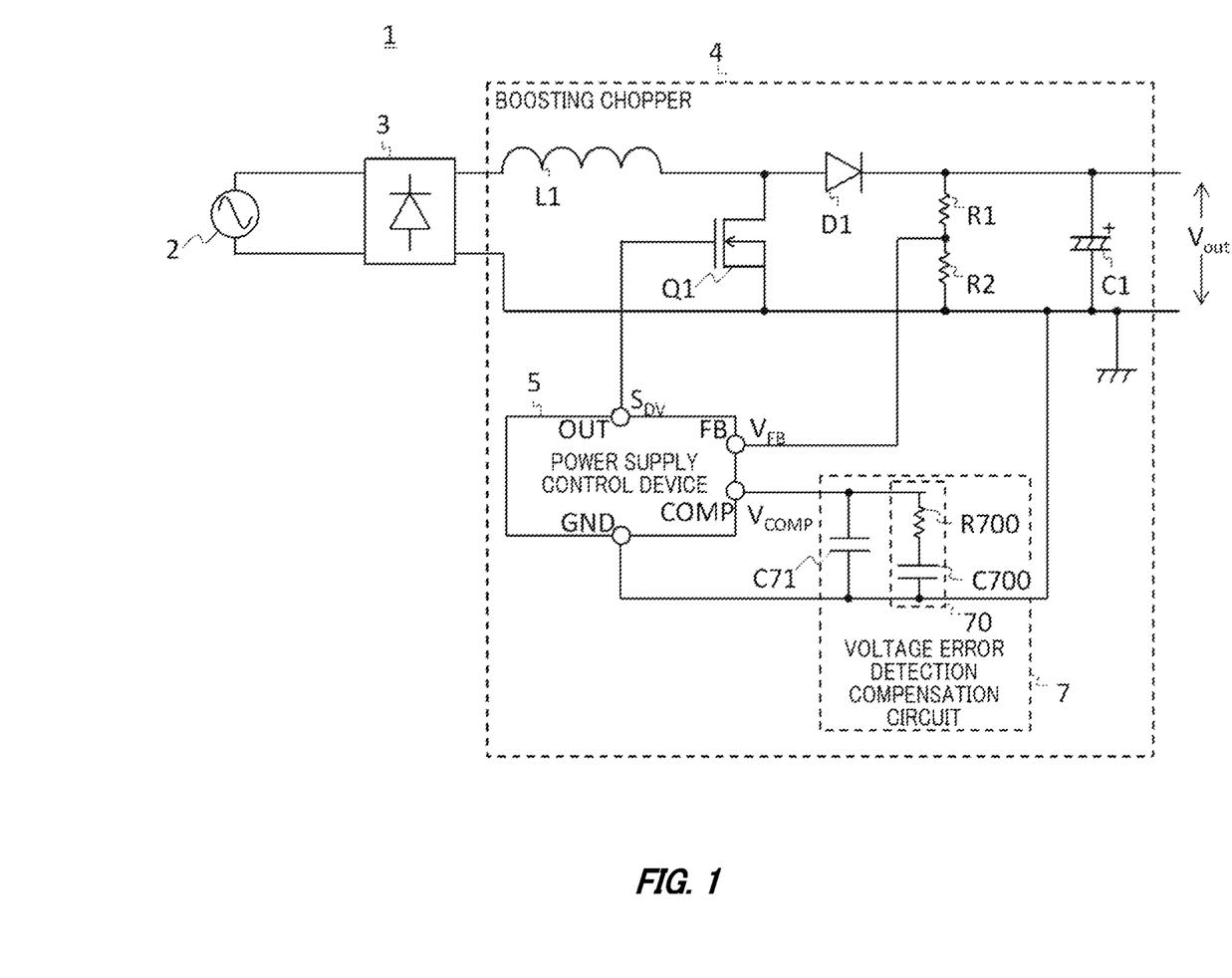
FIG. 1 illustrates a power supply device 1 according to the present embodiment.

[1. Power supply device] FIG. 1 illustrates a power supply device 1 according to the present embodiment. The power supply device 1 includes a AC power supply 2, a full-wave rectifying circuit 3 for full-wave rectifying the AC input voltage of this AC power supply 2, and a boosting chopper 4 for stepping up the DC output voltage of the full-wave rectifying circuit 3. Note that, a smoothing capacitor that is not illustrated may be connected between the positive pole output side and the negative pole output side of the full-wave rectifying circuit 3.

[1-1. Boosting chopper 4] The boosting chopper 4 is connected between the positive pole output side and the negative pole output side of the full-wave rectifying circuit 3, and functions as a power factor improvement circuit in the present embodiment, as an example. The boosting chopper 4 includes an inductor L1 and a diode D1 connected in series at the positive pole output side of the full-wave rectifying circuit 3, a step-up switching device Q1, an output capacitor C1 connected between the cathode side of the diode D1 and the negative pole output side of the full-wave rectifying circuit 3, voltage dividing resistors R1, R2 connected in parallel with the output capacitor C1 to detect an output voltage, a power supply control device 5, and a voltage error detection compensation circuit 7.

The inductor L1 rectifies a current as well as steps up the DC output voltage of the full-wave rectifying circuit 3 using induction voltage accompanying the internal operation of the boosting chopper 4. The inductor current IL1 may be a harmonic pulsating flow having a wavelength of 10 kHz to 1000 kHz, as an example. The diode D1 functions as a back flow preventing diode. The switching device Q1 is, for example, an N-channel MOS transistor. Alternatively, the switching device Q1 may be another MOS transistor, IGBT, or the like. The drain-and source terminals of the switching device Q1 is electrically connected between the connection point of the inductor L1 and the anode side of the diode D1, and the negative pole output side of the full-wave rectifying circuit 3, and the gate is driven by a drive signal from the power supply control device 5. As an example, the switching device Q1 is driven by PWM. The output capacitor C1 smoothens the voltage output from the power supply device 1. The output voltage $V_{out}$ may be approximately 400 V, as an example. The voltage dividing resistors R1, R2 are connected to each other in series.

The power supply control device 5 may be IC, for example, and includes a feedback terminal FB as an output voltage detection terminal, an output terminal OUT, a ground terminal GND, and a voltage error detection compensation terminal COMP. A connection point of the voltage dividing resistors R1, R2 is connected to the feedback terminal FB, and the divided voltage of the output voltage $V_{out}$ of the power supply device 1 is input as the detection voltage (also referred to as feedback voltage $V_{FB}$). The output terminal OUT outputs a drive signal $S_{DV}$ pulse-width modulated to drive the step-up switching device Q1. A voltage error detection compensation circuit 7 is connected between the voltage error detection compensation terminal COMP and the ground.

The voltage error detection compensation circuit 7 is for removing ripple components of an error signal $V_{COMP}$ described below, and includes a capacitor C71 and an RC phase compensation circuit 70 that are connected in parallel. The RC phase compensation circuit 70 includes a resistor R700 and a capacitor C700 that are connected in series.

Figure 2:
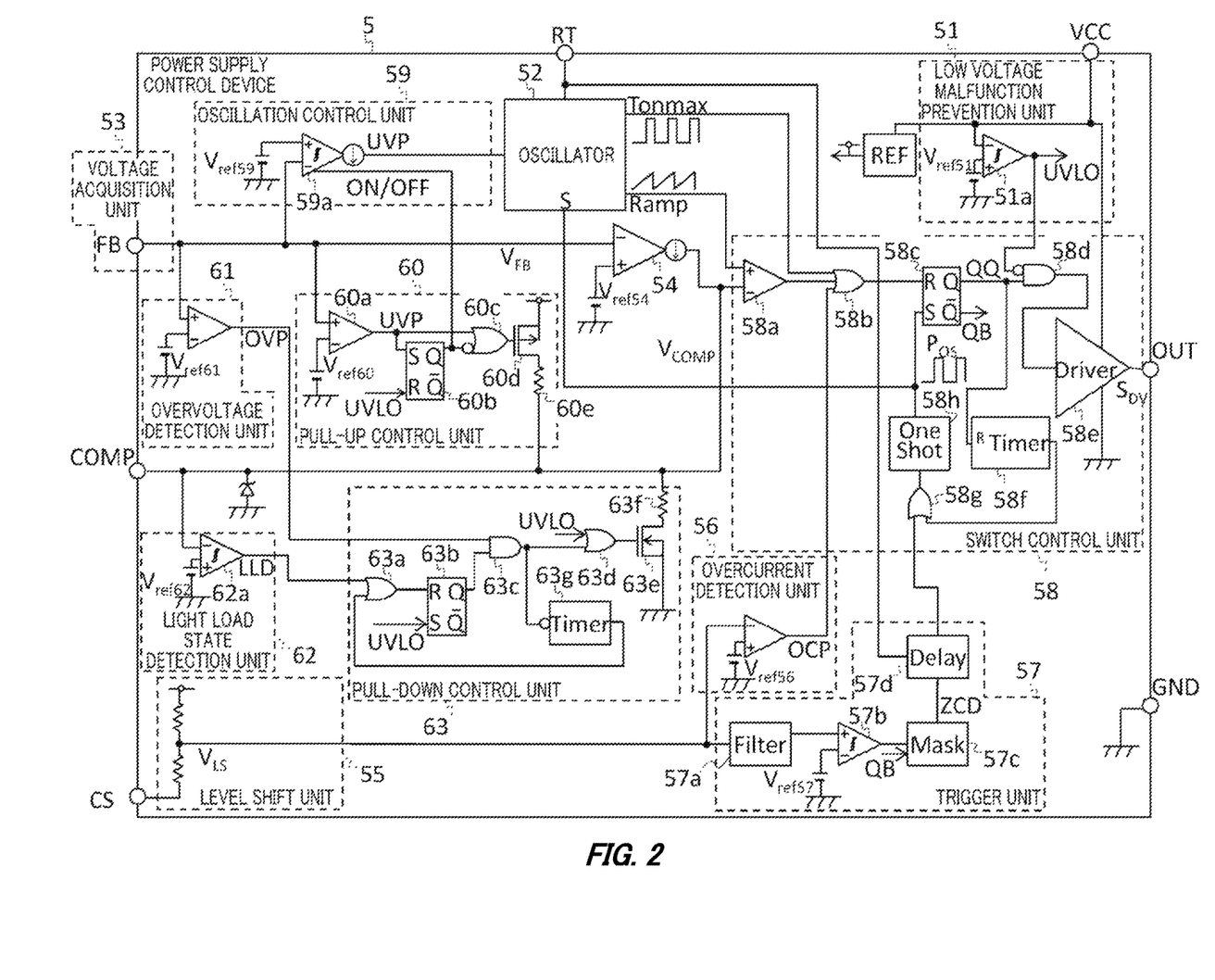
FIG. 2 illustrates a power supply control device 5.

[2. Power supply control device 5] FIG. 2 illustrates a power supply control device 5. The power supply control device 5 includes a low voltage malfunction prevention unit 51, an oscillator 52, a voltage acquisition unit 53, an error amplifier 54, a level shift unit 55, an overcurrent detection unit 56, a trigger unit 57, a switch control unit 58, an oscillation control unit 59, a pull-up control unit 60, an overvoltage detection unit 61, a light load state detection unit 62, and a pull-down control unit 63. In addition, in the present embodiment, as an example, the power supply control device 5 includes a resistor connection terminal RT to which a resistor is connected, a control power source terminal VCC to which control voltage Vcc is input, and a current detection terminal CS for detecting an inductor current ILL in addition to the above-described feedback terminal FB, the output terminal OUT, the ground terminal GND, and the voltage error detection compensation terminal COMP. Note that, the control voltage Vcc may be a voltage generated by voltage induced by an auxiliary winding of a transformer provided on the output side of the power supply device 1, as an example. A detection voltage of a current detection resistor (not illustrated) connected between the DC negative pole output side of the full-wave rectifying circuit 3 and the ground for detecting a inductor current IL1 may be input to the current detection terminal CS.

[2-1. Low voltage malfunction prevention unit 51] The low voltage malfunction prevention unit 51 includes a comparator 51a. A control power source terminal VCC is connected to the inverting input terminal of the comparator 51a, and a reference voltage $V_{ref51}$ which becomes the low voltage threshold is input to the non-inverting input terminal. In this way, the output signal (also referred to as low voltage detection signal) UVLO of the comparator becomes a low level which indicates a normal state in case where the control voltage Vcc is higher than the reference voltage $V_{ref51}$, and becomes a high level which indicates a low voltage abnormality in case where the control voltage Vcc is lower than the reference voltage $V_{ref51}$. The comparator 51a may have hysteresis characteristics, and the reference voltage $V_{ref51}$ may be 12.5 V and 7.5 V, for example.

[2-2. Oscillator 52] The oscillator 52 generates an oscillation wave. For example, the oscillator 52 generates a ramp wave Ramp as the oscillation wave. The ramp wave Ramp may be a triangular wave (a sawtooth wave as an example). The oscillator 52 may be connected to a resistor (not illustrated) for determining a reference frequency of the oscillation, via the resistor connection terminal RT of the power supply control device 5. The oscillator 52 includes a signal input terminal S to which a one-shot pulse $P_{OS}$ is input, and may generate the ramp wave Ramp having a voltage waveform that dives in accordance with the timing of the one-shot pulse $P_{OS}$, and then gradually increases. In addition, the oscillator 52 may generate a pulse signal Tonmax using the one-shot pulse $P_{os}$. The oscillator 52 may supply the ramp wave Ramp and the pulse signal Tonmax to the switch control unit 58.

[2-3. Voltage acquisition unit 53] The voltage acquisition unit 53 acquires the DC output voltage $V_{out}$ corresponding to the output of the boosting chopper 4. In the present embodiment, as an example, the voltage acquisition unit 53 is a feedback terminal FB of the power supply control device 5, and acquires the feedback voltage $V_{FB}$ obtained by dividing the output voltage $V_{out}$ with the voltage dividing resistors R1, R2 (see FIG. 1) as the DC output voltage $V_{out}$. In this way, it is possible to perform control using the feedback voltage $V_{FB}$ that is lower than the DC output voltage $V_{out}$. The feedback voltage $V_{FB}$ acquired by the voltage acquisition unit 53 may be supplied to the error amplifier 54, the oscillation control unit 59, the pull-up control unit 60, the overvoltage detection unit 61, or the like.

[2-4. Error amplifier 54] The error amplifier 54 amplifies the differential voltage between the feedback voltage $V_{FB}$ and the reference voltage $V_{ref54}$. For example, the feedback voltage $V_{FB}$ is supplied to the inverting input side of the error amplifier 54, and the reference voltage $V_{ref54}$ corresponding to the target output voltage is supplied to the non-inverting input side. As an example, the reference voltage $V_{ref54}$ may be a maximum feedback voltage $V_{fb}$. The error amplifier 42 may be a mutual conductance amplifier. The error amplifier 54 may generate a current corresponding to the differential voltage, and generate an error signal $V_{COMP}$ by charging the capacitor C71 of the voltage error detection compensation circuit 7 connected to the voltage error detection compensation terminal COMP. The ripple component included in the output current of the error amplifier 54 is smoothened by generating an error signal $V_{COMP}$ using the voltage error detection compensation circuit 7, and the error signal $V_{COMP}$ becomes a substantial DC voltage in a steady state. The error signal $V_{COMP}$ may be supplied to the switch control unit 58, the pull-up control unit 60, the light load state detection unit 62, the pull-down control unit 63, and the like.

[2-5. Level shift unit 55] The level shift unit 55 pulls up the negative voltage input to the current detection terminal CS according to the inductor current IL1 to convert it into a positive voltage. The smaller the current flowing to the above-described current detection resistor connected between the DC negative pole output side of the full-wave rectifying circuit 3 and the ground, the higher the converted voltage $V_{LS}$ becomes. The voltage $V_{LS}$ pulled up by the level shift unit 55 is supplied to the overcurrent detection unit 56 and the trigger unit 57.

[2-6. Overcurrent detection unit 56] The overcurrent detection unit 56 detects an overcurrent of the inductor current IL 1. For example, the overcurrent detection unit 56 supplies, to the switch control unit 58, the overcurrent detection signal OCP which becomes a high level in case where the voltage $V_{LS}$ from the level shift unit 55 is lower than the reference voltage $V_{ref56}$ (in the present embodiment, as an example, in case where the above-described current flowing to the current detection resistor is large). As an example, the reference voltage $V_{ref56}$ may be −0.6 V.

[2-7. Trigger unit 57] The trigger unit 57 switches the switching device Q1 to an ON state in response to the current flowing to the boosting chopper 4 becoming lower than the reference current. The trigger unit 57 includes a filter 57a, a comparator 57b, a mask circuit 57c, and a delay circuit 57d. The filter 57a removes the noise of the voltage $V_{LS}$ and inputs it to the comparator 57b. A voltage $V_{LS}$ from the filter 57a is input to the non-inverting input terminal of the comparator 57b, and the reference voltage $V_{ref57}$ is input to the inverting input terminal. The reference voltage $V_{ref57}$ may be a voltage (−4 mV, as an example) in case where the current flowing to the boosting chopper 4 is the reference current (for example, a current which is slightly larger than a zero current). In this way, a determination signal at a high level is output form the comparator 57b in case where the inductor current IL1 is reduced to become a zero current by switching the switching device Q1 to an OFF state. The comparator 57b supplies an output signal to the mask circuit 57c. The mask circuit 57c transmits the output of the comparator 57b to the delay circuit 57d so as to prevent malfunction due to noise right after switching the switching device Q1 to an OFF state, and for a predetermined period, even in case where the output of the comparator 57b changes, the mask circuit 57c transmits the output before change. For example, the mask circuit 57c retains the output of the comparator 57b immediately before the rising of the negative output signal QB until a timing at which a predetermined time (for example, 700 ns) has passed, in response to the rising at a high level of a negative output signal QB from the RS flip flop 58c described below in the switch control unit 58 (in the present embodiment, as an example, the switching device Q1 being turned off). Here, the output of the comparator 57b and the mask circuit 57c are maintained at a high level, since current does not flow to the inductor L1 in case where the AC input voltage from the AC power supply 2 is blocked. Thus, the output signal from the mask circuit 57c (also referred to as a zero current detection signal ZCD) indicates whether the pulsating flow current flowing through the inductor L1 is zero (or near zero). The zero current detection signal ZCD may be supplied to the switch control unit 58 via the delay circuit 57d.

[2-8. Switch control unit 58] The switch control unit 58 controls the ON/OFF state of the switching device Q1 using an oscillation wave (in the present embodiment, as an example, a ramp wave Ramp). The switch control unit 58 includes a pulse width modulation comparator 58a, an OR gate 58b, an RS flip flop 58c, an AND gate 58d, a driver 58e, a restart timer 58f, an OR gate 58g, and a one-shot circuit 58h.

The pulse width modulation comparator 58a outputs a pulse width modulation signal for modulating the pulse width of a drive signal of the switching device Q1. An oscillation wave (in the present embodiment, as an example, a ramp wave Ramp) from the oscillator 52 is input to the non-inverting input terminal of the pulse width modulation comparator 58a, and an error signal $V_{COMP}$ generated by the error amplifier 54 and the voltage error detection compensation circuit 7 is input to the inverting input terminal. The error signal $V_{COMP}$ is an example of a threshold voltage for turning off the switching device Q1. The pulse width modulation comparator 58a outputs an output signal to the OR gate 58b. The OR gate 58b supplies, to the RS flip flop 58c, a signal which is a logical disjunction of the pulse width modulation signal from the pulse width modulation comparator 58a, the pulse signal Tonmax from the oscillator 52, and the overcurrent detection signal OCP from the overcurrent detection unit 56. A one-shot pulse $P_{OS}$ from the one-shot circuit 58h is input to the set terminal S of the RS flip flop 58c, and an output signal of the OR gate 58b is input to the reset terminal R. The RS flip flop 58c supplies a positive output signal QQ from the positive output terminal Q to the AND gate 58d and the restart timer 58f. In addition, the RS flip flop 58c supplies a negative output signal QB from the negative output terminal QB to the mask circuit 57c. The AND gate 58d supplies, to the driver 58e, a signal which is a logical conjunction of a positive output signal QQ of the RS flip flop 58c and an inverting signal of a low voltage malfunction prevention signal UVLO from the low voltage malfunction prevention unit 51. The driver 58e outputs a drive signal $S_{DV}$ to a gate of the switching device Q1 via the output terminal OUT. The restart timer 58f generates a start signal in response to a positive output signal QQ at a high level being input from the RS flip flop 58c, and supplies the start signal to the one-shot circuit 58h via the OR gate 58g. The OR gate 58g supplies, to the one-shot circuit 58h, a signal which is a logical disjunction of the zero current detection signal ZCD from the trigger unit 57 and the start signal from the restart timer 58f. The one-shot circuit 58h supplies, to the set terminal S of the RS flip flop 58c, a one-shot pulse $P_{OS}$ that rises in response to a signal at a high level being input. In this way, the RS flip flop 58c is set in response to the current flowing through the boosting chopper 4 becoming lower than the reference current (a zero current, as an example).

[2-9. Oscillation control unit 593] The oscillation control unit 59 reduces a change speed of the oscillation wave (in the present embodiment, as an example, a ramp wave Ramp) from the oscillator 52 during at least a part of a period during which the switching device Q1 is in an ON state, in response to a drop in the DC output voltage $V_{OUT}$ corresponding to the output of the boosting chopper 4. For example, the oscillation control unit 59 gradually decreases the change speed of the oscillation wave (in the present embodiment, as an example, the inclination of the ramp wave Ramp) during at least a part of a period during which the switching device Q1 is in an ON state, as the feedback voltage $V_{FB}$ drops. For example, the oscillation control unit 59 includes a current output amplifier 59a. The current output amplifier 59a may be a mutual conductance amplifier. The feedback voltage $V_{FB}$ obtained by detecting the DC output voltage $V_{OUT}$ from the voltage acquisition unit 53 is input to the inverting output terminal of the current output amplifier 59a, and a reference voltage $V_{ref59}$ as a threshold for power factor improvement operation of the boosting chopper 4 is input to the inverting output terminal. The current output amplifier 59a outputs a current corresponding to the differential voltage, and supplies it to the oscillator 52. As will be described in detail below, the current from the current output amplifier 59a reduces the change speed of the ramp wave Ramp output from the oscillator 52.

The current output amplifier 59a may provide hysteresis between the reference voltage $V_{ref59}$ used in case where the detection voltage is equal to or higher than the reference voltage $V_{ref59}$ and the reference voltage $V_{ref59}$ used in case where the detection voltage is lower than the reference voltage $V_{ref59}$. For example, the reference voltage $V_{ref59}$ in case where whether the detection voltage is lower than the reference voltage $V_{ref59}$ is determined may be lower than the reference voltage $V_{ref59}$ in case where whether the detection voltage reaches the reference voltage $V_{ref59}$ is determined. As an example, the reference voltage $V_{ref59}$ may be a maximum feedback voltage $V_{fb}$, and may be 0.72×the maximum feedback voltage $V_{fb}$.

[2-10. Pull-up control unit 60] The pull-up control unit 60 pulls up the output of the error amplifier 54. Note that, in the present embodiment, when the output of the error amplifier 54 is pulled up, the value of the error signal $V_{COMP}$ becomes large. As a result, the ON width of the switching device Q1 is widened and a larger energy is transmitted to the output side and the output voltage $V_{OUT}$ and the feedback voltage $V_{FB}$ rise. The pull-up control unit 60 includes a comparator 60a, an RS flip flop 60b, an OR gate 60c, a P-channel MOSFET 60d, and a pull-up resistor 60e.

The feedback voltage $V_{FB}$ is input to the non-inverting input terminal of the comparator 60a, and the reference voltage $V_{ref60}$ is input to the inverting input terminal. As an example, the reference voltage $V_{ref60}$ may be 0.86×the maximum feedback voltage $V_{fb}$. The comparator 60a supplies the output signal UVP to the RS flip flop 60b. A low voltage malfunction prevention signal UVLO from the low voltage malfunction prevention unit 51 is input to the reset terminal R of the RS flip flop 60b. The RS flip flop 60b may be reset dominant. The RS flip flop 60b supplies an inverting signal of the output signal from the positive output terminal Q to the OR gate 60c. Note that, the RS flip flop 60b may be an example of an operation control unit, and may maintain the current output amplifier 59a of the oscillation control unit 59 in an enabled state, in response to the DC output voltage $V_{out}$ exceeding the threshold voltage (in the present embodiment, as an example, in response to the feedback voltage $V_{FB}$ exceeding the reference voltage $V_{ref60}$). In addition, the RS flip flop 60b may disable the current output amplifier 59a in case where the control voltage Vcc is lower than the reference voltage $V_{ref51}$ (in the present embodiment, as an example, in case where the low voltage malfunction prevention signal UVLO is high). For example, the output signal from the positive output terminal Q of the RS flip flop 60b may be supplied to the current output amplifier 59a of the oscillation control unit 59 to switch the ON/OFF state of the current output amplifier 59a. The OR gate 60c supplies, to the gate of the P-channel MOSFET 60d, a signal which is a logical disjunction of the output signal UVP from the comparator 60a and an inverting signal of the output signal from the positive output terminal Q of the RS flip flop 60b. The P-channel MOSFET 60d is connected in series to the pull-up resistor 60e between the internal bias power supply terminal and the output of the error amplifier 54, and pulls up the output voltage of the error amplifier 54 in an ON state. In the above-described pull-up control unit 60, the pull-up operation is stopped for a period from when the feedback voltage $V_{FB}$ exceeds the reference voltage $V_{ref60}$ to when it becomes equal to or lower than the reference voltage $V_{ref60}$, and while the control power supply Vcc is equal to or lower than the reference voltage $V_{ref51}$ and the signal UVLO is at a high level. Thus, an overvoltage state upon activation or at low voltage malfunction prevention state is suppressed.

[2-11. Overvoltage detection unit 61] The overvoltage detection unit 61 detects overvoltage of the output voltage $V_{out}$ of the power supply device 1. For example, the overvoltage detection unit 61 supplies, to the pull-down control unit 63, an overvoltage detection signal OVP that becomes a high level in case where the feedback voltage $V_{FB}$ is higher than the reference voltage $V_{ref61}$. As an example, the reference voltage $V_{ref61}$ may be 0.98×the maximum feedback voltage $V_{fb}$.

[2-12. Light load state detection unit 62] The light load state detection unit 62 detects that the power supply device 1 is in a light load state. Note that, in the present embodiment, the error signal $V_{COMP}$ becomes small when the power supply device 1 is in a light load state. The light load state detection unit 62 includes a comparator 62a having hysteresis characteristics. An error signal $V_{COMP}$ is supplied to the inverting input terminal of the comparator 62a, and a reference voltage $V_{ref62}$ of 0.60 V and 0.75 V, for example, is input to the non-inverting input terminal. In this way, the output signal (also referred to as a light load detection signal) LLD of the comparator 62a becomes a high level when the error signal $V_{COMP}$ is 0.60 V or lower, and becomes a low level when it becomes 0.70 V or higher thereafter. The comparator 62a supplies the light load detection signal LLD to the pull-down control unit 63.

[2-13. Pull-down control unit 63] The pull-down control unit 63 pulls down the output of the error amplifier 54. The pull-down control unit 63 includes an OR gate 63a, an RS flip flop 63b, an AND gate 63c, an OR gate 63d, an N-channel MOSFET 63e, a pull-down resistor 63f, and a timer 63g. The OR gate 63a supplies, to the reset terminal of the RS flip flop 63b, a signal which is a logical disjunction of the light load detection signal LLD from the light load state detection unit 62 and the output signal of the timer 63g. The low voltage malfunction prevention signal UVLO from the low voltage malfunction prevention unit 51 is input to the set terminal of the RS flip flop 63b. The RS flip flop 63b may be reset dominant. The RS flip flop 63b supplies the output signal from the positive output terminal Q to the AND gate 63c. The AND gate 63c supplies, to the OR gate 63d and the timer 63g, a signal which is a logical conjunction of the output signal from the positive output terminal Q of the RS flip flop 63b and the overvoltage detection signal OVP from the overvoltage detection unit 61. The OR gate 63d inputs, to the gate of the N-channel MOSFET 63e, a signal which is a logical disjunction of the output signal from the AND gate 63c and the low voltage malfunction prevention signal UVLO from the low voltage malfunction prevention unit 51. The N-channel MOSFET 63e is connected in series to the pull-down resistor 63f between the output terminal of the error amplifier 54 and the ground, and pulls down the output voltage of the error amplifier 54 in an ON state. The timer 63g resets the RS flip flop 63b by outputting a pulse signal at a high level to the OR gate 63a when the output signal of the AND gate 63c continues to be in a high level state for a predetermined period. In this way, the output of the AND gate 63c becomes a high level and the period during which the N-channel MOSFET 63e is caused to be in an ON state is limited. In the above-described pull-down control unit 63, in case where the low voltage malfunction prevention signal UVLO becomes a high level, or in case where the RS flip flop 63b is set by the low voltage malfunction prevention signal UVLO becoming a high level and the overvoltage detection signal OVP is at a high level, the output voltage of the error amplifier 54 is pulled down, and the error signal $V_{COMP}$ is fixed to be at a voltage that is lower than the predetermined reference voltage (the reference voltage $V_{ref524}$ described below, as an example (see FIG. 3)).

Figure 3:
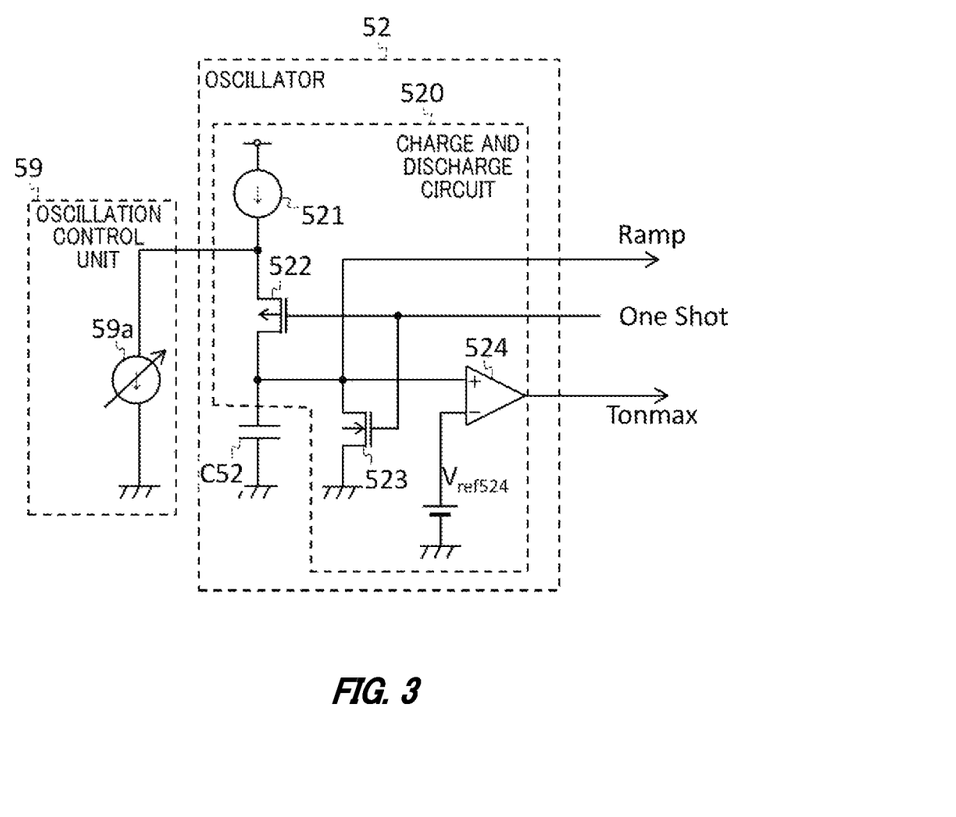
FIG. 3 illustrates an oscillator 52 and an oscillation control unit 59.

[2-14. Inner structure of the oscillator 52 and the oscillation control unit 59] FIG. 3 illustrates an oscillator 52 and an oscillation control unit 59.

[2-14-1. Oscillator 52] The oscillator 52 includes a capacitor C52 and a charge and discharge circuit 520 for charging and discharging the capacitor C52. The capacitor C52 is grounded on one side, and is connected to the charge and discharge circuit 520 on the other side. The charge amount of the capacitor C52 varies depending on the charge and discharge circuit 520, and is output as a Ramp signal.

The charge and discharge circuit 520 includes a current source 521, a P-channel MOSFET 522, an N-channel MOSFET 523, and a comparator 524.

The current source 521 is a current source that outputs a constant current, and is connected in series to the P-channel MOSFET 522 between the control power supply Vcc and the capacitor C52.

The P-channel MOSFET 522 has its gate connected to the one-shot circuit 58h of the switch control unit 58, and is turned OFF by the rising of a one-shot pulse $P_{OS}$ and turned ON by its falling. In the present embodiment, charging of the capacitor C52 stops when the P-channel MOSFET 522 is turned OFF, and the capacitor C52 is charged with a current from the current source 521 when the P-channel MOSFET 522 is turned ON.

The N-channel MOSFET 523 is connected in parallel with the charge and discharge capacitor C 52 between the P-channel MOSFET 522 and the ground. The N-channel MOSFET 523 has its gate connected to the one-shot circuit 58h of the switch control unit 58, and is turned ON by the rising of a one-shot pulse $P_{OS}$ and turned OFF by its falling. In the present embodiment, the capacitor C52 is discharged when the N-channel MOSFET 523 is turned ON, and the discharge of the capacitor C52 stops when the N-channel MOSFET 523 is turned OFF.

A charge voltage of the charge and discharge capacitor C52 is input to the non-inverting input terminal of the comparator 524, and the reference voltage $V_{ref524}$ is input to the inverting input terminal. In this way, a pulse signal Tonmax which becomes a high level in case where the discharge voltage from the capacitor C52 is larger than the reference voltage $V_{ref524}$ is output from the comparator 524.

[2-14-2. Oscillation control unit 59] The oscillation control unit 59 reduces a charge current supplied to the capacitor C52 by the charge and discharge circuit 520, in response to a drop in the DC output voltage $V_{OUT}$. For example, the current output amplifier 59a may reduce a current corresponding to the differential voltage between the reference voltage $V_{ref59}$ and the feedback voltage $V_{FB}$ from the charge current of the capacitor C52. As an example, the current output amplifier 59a of the oscillation control unit 59 may be connected between the connection point of the current source 521 and the P-channel MOSFET 522 and the ground, so as to function as the current source of a sink type (absorption type). Alternatively, the current output amplifier 59a of the oscillation control unit 59 may be connected between the connection point of the P-channel MOSFET 522 and the capacitor C52, and the ground. The absorption current by the current output amplifier 59a may increase in accordance with the differential voltage, and may increase continuously or increase in a stepped manner in accordance with the differential voltage, as an example. In this way, a current that varies according to the size of the differential voltage is reduced from the charge current of the capacitor C52.

Note that, the current output amplifier 59a does not cause the charge current to change in case where the feedback voltage $V_{FB}$ is equal to or higher than the reference voltage $V_{ref59}$, and may reduce a current that varies according to the size of the difference between the reference voltage $V_{ref59}$ and the feedback voltage $V_{FB}$ from the charge current in case where the feedback voltage $V_{FB}$ is lower than the reference voltage $V_{ref59}$.

According to the above-described oscillation control unit 59, the change speed of the oscillation wave can be gradually decreased since the charge current is reduced according to the size of the difference between the reference voltage $V_{ref59}$ and the feedback voltage $V_{FB}$, in case where the feedback voltage $V_{FB}$ is lower than the reference voltage $V_{ref59}$. In addition, in case where the feedback voltage $V_{FB}$ is equal to or higher than the reference voltage $V_{ref59}$, variation in the output voltage $V_{out}$ can be prevented since the charge current does not change.

Note that, the absorption current may not increase according to the differential voltage in case where the feedback voltage $V_{FB}$ is lower than the reference voltage $V_{ref59}$, and may become large as compared to the absorption current in case where the feedback voltage $V_{FB}$ is equal to or higher than the reference voltage $V_{ref59}$. As an example, the absorption current may be zero in case where the feedback voltage $V_{FB}$ is equal to or higher than the reference voltage $V_{ref59}$, and the absorption current may be a predetermined positive current in case where the feedback voltage $V_{FB}$ is lower than the reference voltage $V_{ref59}$. In this case, the oscillation control unit 59 may include a comparator for outputting an output signal at a high level in case where the feedback voltage $V_{FB}$ is lower than the reference voltage $V_{ref59}$, and a current source for absorbing, from the charge current, the constant current in response to an output signal at a high level being supplied from the comparator.

According to the above-described power supply control device 5, the timing at which the ramp wave Ramp exceeds the threshold voltage (in the present embodiment, as an example, the error voltage $V_{COMP}$), and thus the timing at which the switching device is turned to an OFF state, since the change speed of the ramp wave Ramp during at least a part of a period during which the switching device Q1 is in an ON state is reduced, in response to a drop in the DC output voltage $V_{OUT}$ corresponding to the output of the boosting chopper 4. As a result, the ON period of the switching device becomes large, and the output of the boosting chopper 4 rises. Therefore, since a drop in the output voltage $V_{out}$ can be prevented by reducing the change speed of the oscillation wave, responsiveness in case where a drop in the output voltage $V_{out}$ is prevented can be increased.

In addition, since the change speed of the ramp wave Ramp is gradually decreased, a sudden change in the element current of the switching device Q1 can be prevented, as compared to a case where the change speed is switched in a stepped manner. Therefore, a sudden change in the element current of the inductor L1 can be prevented to prevent an audible sound from occurring.

In addition, the oscillation control unit 59 can be prevented from operating upon activation to become in an overvoltage state, since the current output amplifier 59a of the oscillation control unit 59 is maintained to be in an enabled state, in response to the feedback voltage $V_{FB}$ exceeding the reference voltage $V_{ref60}$. In addition, the oscillation control unit 59 can be prevented from operating to become in an overvoltage state in case when in a low voltage malfunction prevention state, since the current output amplifier 59a is disabled in case where the low voltage malfunction prevention signal UVLO is at a high level.

In addition, the operation of the power supply control device 4 can be stabilized, in case where the detection voltage slightly varies near the reference voltage $V_{ref59}$, since the current output amplifier 59a has hysteresis characteristics.

In addition, a drop in the output current can be prevented since the switching device Q1 is switched to an ON state in response to the current flowing to the boosting chopper 4 becoming lower than the reference current.

Figure 4:
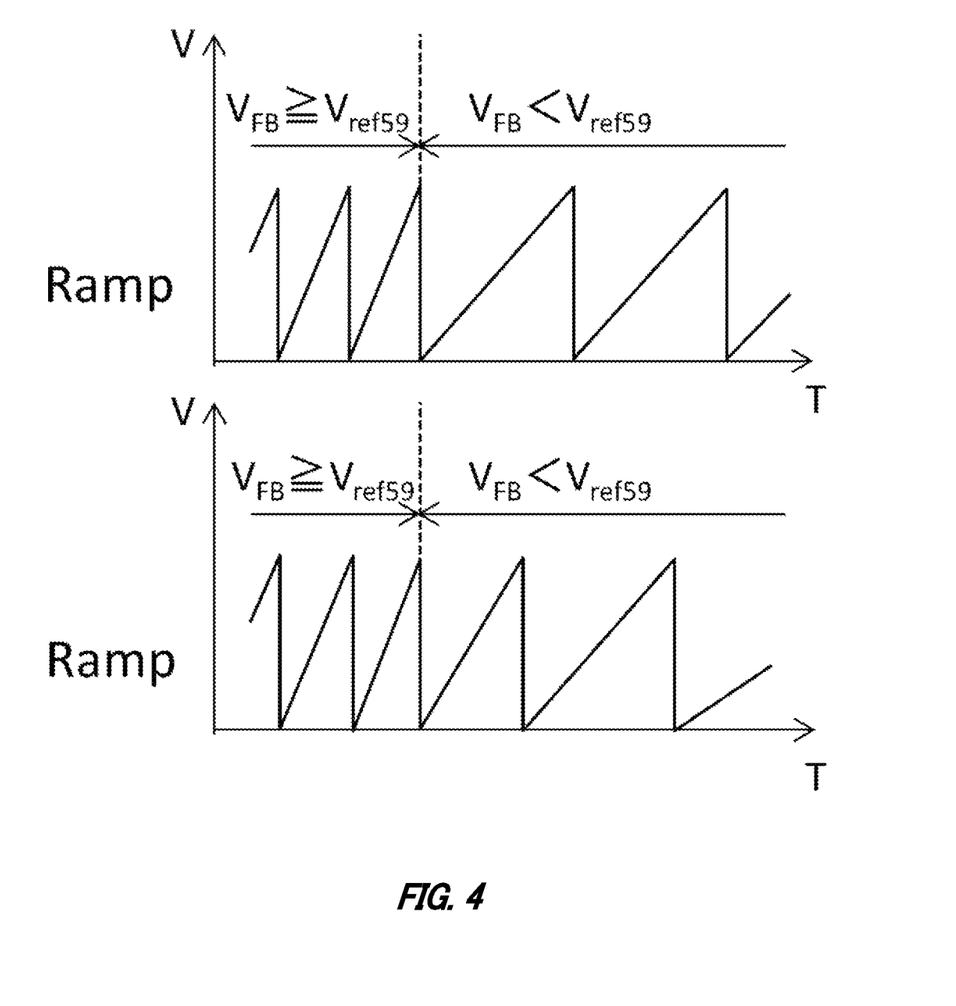
FIG. 4 illustrates a change in the ramp wave Ramp in case where a feedback voltage $V_{FB}$ drops.

[3. Operation waveforms] FIG. 4 illustrates a change in the ramp wave Ramp in case where a feedback voltage $V_{FB}$ drops. In the figure, the vertical axis indicates the voltage and the horizontal axis indicates the time.

The upper ramp wave Ramp in the figure is a waveform in case where the absorption current by the oscillation control unit 59 turns into a predetermined positive current from zero in response to the feedback voltage $V_{FB}$ becoming lower than the reference voltage $V_{ref59}$. In this ramp wave Ramp, the change speed is increased in case where the feedback voltage $V_{FB}$ is equal to or higher than the reference voltage $V_{ref59}$, and the change speed is reduced in case where the feedback voltage $V_{FB}$ is lower than the reference voltage $V_{ref59}$. In addition, the change speed of the ramp wave Ramp in case where the feedback voltage $V_{FB}$ is lower than the reference voltage $V_{ref59}$ is constant regardless of the differential voltage.

In addition, the lower ramp wave Ramp in the figure is a waveform in case where the absorption current by the oscillation control unit 59 becomes continuously large in accordance with the size of the differential voltage between the feedback voltage $V_{FB}$ and the reference voltage $V_{ref59}$. In this ramp wave Ramp, the change speed is increased in case where the feedback voltage $V_{FB}$ is equal to or higher than the reference voltage $V_{ref59}$, and the change speed is reduced in case where the feedback voltage $V_{FB}$ is lower than the reference voltage $V_{ref59}$. In addition, the change speed of the ramp wave Ramp in case where the feedback voltage $V_{FB}$ is lower than the reference voltage $V_{ref59}$ gradually decreases in accordance with the differential voltage.

Figure 5:
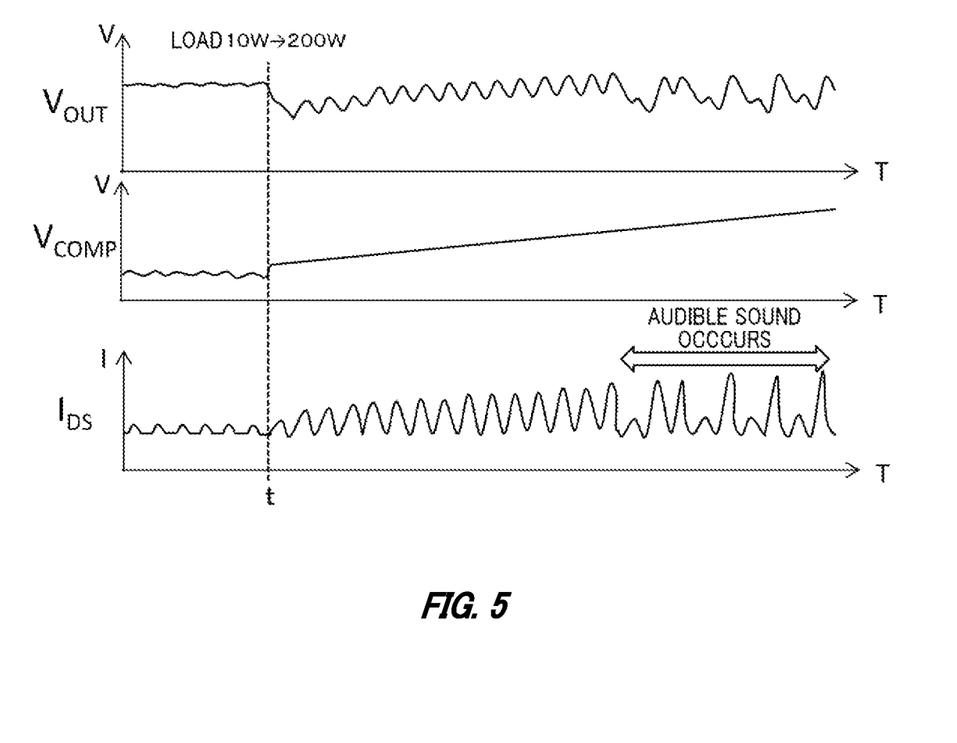
FIG. 5 illustrates operation waveforms before and after the sudden increase of loads.

FIG. 5 illustrates the operation waveforms before and after the sudden increase in the load in case where the change speed of the ramp wave Ramp is constant (see the upper ramp wave Ramp in FIG. 4) regardless of the differential voltage between the two voltages in case where feedback voltage $V_{FB}$<reference voltage $V_{ref59}$. In the figure, the upper waveform illustrates the output voltage $V_{OUT}$, the middle waveform illustrates the error voltage $V_{COMP}$, and the bottom waveform illustrates the element current IDS of the switching device Q1. The horizontal axis indicates the time, and in the present figure, the load is suddenly increased at time point t.

As shown in this figure, the drop in the output voltage $V_{out}$ can be prevented with high responsiveness by reducing the change speed of the ramp wave Ramp in response to the drop in the feedback voltage $V_{FB}$. Note that, in this figure, it is indicated that an audible sound is generated due to the disturbance of the waveform of the element current IDS.

Figure 6:
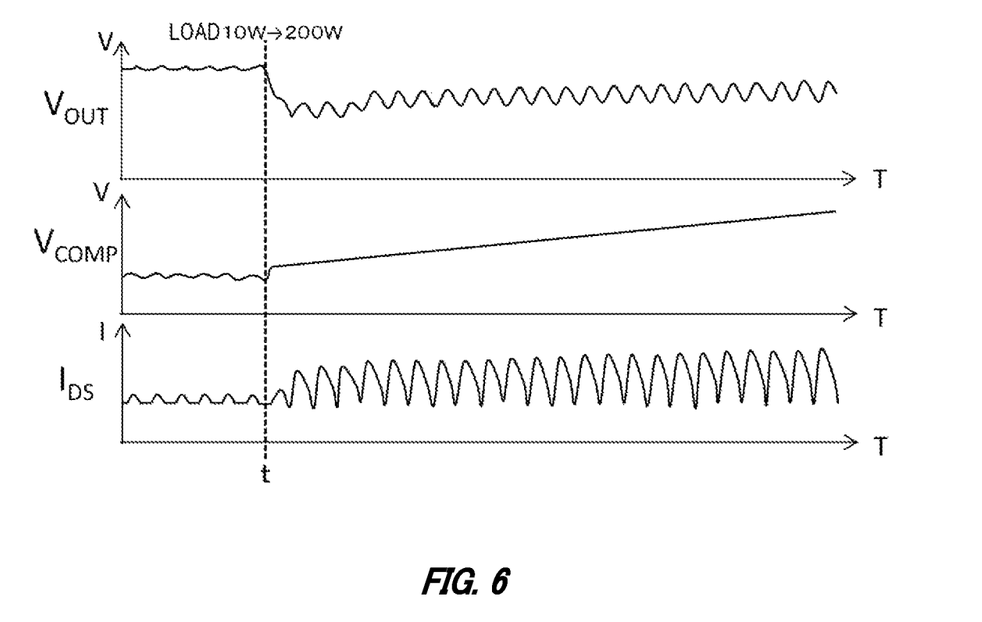
FIG. 6 illustrates operation waveforms before and after the sudden increase of loads.

FIG. 6 illustrates the operation waveforms before and after the sudden increase in the load in case where the change speed of the ramp wave Ramp is continuously increased (see the lower ramp wave Ramp in FIG. 4) in accordance with the size of the differential voltage between the two voltages in case where feedback voltage $V_{FB}$<reference voltage $V_{ref59}$. The vertical axis and the horizontal axis in the figure are the same as those in FIG. 5.

As shown in this figure, an audible sound due to the disturbance of the waveform of the element current IDS can be prevented by gradually decreasing the change speed of the ramp wave Ramp in case where the feedback voltage $V_{FB}$ is lower than the reference voltage $V_{ref59}$ in accordance with the differential voltage.

Figure 7:
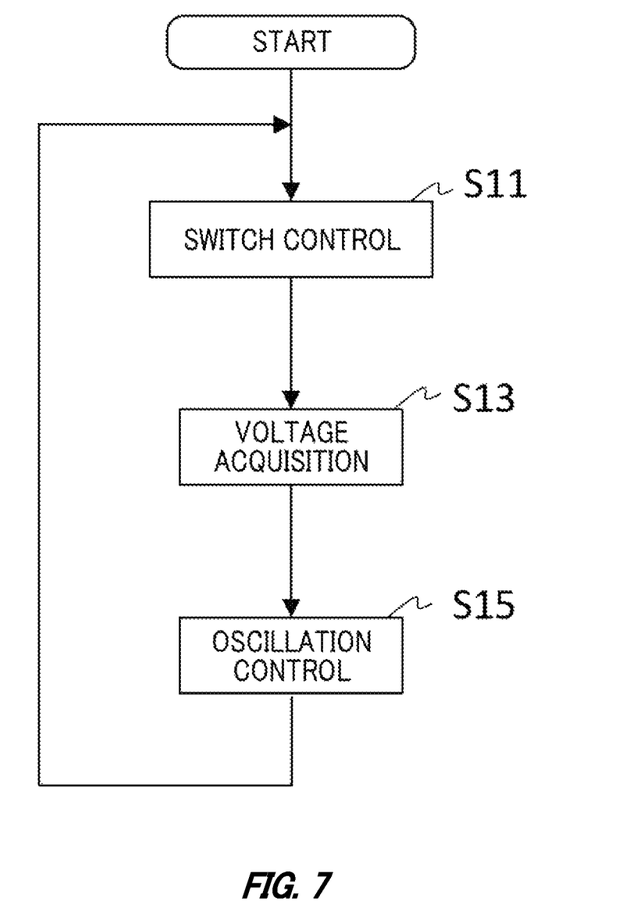
FIG. 7 illustrates the operation of the power supply control device 5.

[4. Operation] FIG. 7 illustrates the operation of the power supply control device 5. Note that, in this figure, the operations of the oscillator 52, the switch control unit 58, and the oscillation control unit 59, among the operations of the power supply control device 5, are illustrated.

At step S11, the switch control unit 59 controls the ON/OFF state of the switching device Q1 of the boosting chopper 4 using a ramp wave Ramp from the oscillator 52. For example, the pulse width modulation comparator 58a inputs, to the reset terminal R of the RS flip flop 58c via the OR gate 58b, a signal that is at a low level in case where the ramp wave Ramp is equal to or lower than the error signal $V_{COMP}$ and is at a high level in case where the ramp wave Ramp is larger than the error signal $V_{COMP}$. In this way, in case where the ramp wave Ramp is equal to or lower than the error signal $V_{COMP}$, the RS flip flop 58 turns the switching device Q1 to an ON state by supplying the positive output signal QQ at a high level to the driver 58, in response to being set by a one-shot pulse from the one-shot circuit 58h. On the other hand, in case where the ramp wave Ramp is larger than the error signal $V_{COMP}$, the RS flip flop 58 is reset, and turns switching device Q1 to an OFF state by supplying a positive output signal QQ at a low level to the driver 58e.

At step S13, the voltage acquisition unit 53 acquires a DC output voltage $V_{OUT}$ corresponding to the output of the boosting chopper 4. For example, the voltage acquisition unit 53 acquires the feedback voltage $V_{FB}$ obtained by dividing the output voltage $V_{out}$ with the voltage dividing resistors R1, R2 as the DC output voltage.

At step S15, the oscillation control unit 59 reduces the change speed of the ramp wave Ramp during at least a part of the period during which the switching device Q1 is in an ON state, in response to a drop in the DC output voltage $V_{OUT}$. For example, the current output amplifier 59a reduces the change speed of the ramp wave Ramp by reducing a current corresponding to the difference between the reference voltage $V_{ref59}$ and the detection voltage obtained by detecting the feedback voltage $V_{FB}$ from the charge current of the capacitor C52.

Hereinbelow, the power supply control device 5 repeats the process of steps S11 to S15. According to the above-described operations, the timing at which the ramp wave Ramp exceeds the threshold voltage (in the present embodiment, as an example, the error voltage $V_{COMP}$), and thus the timing at which the switching device Q1 is turned to an OFF state, since the change speed of the oscillation wave during at least a part of a period during which the switching device Q1 is in an ON state is reduced, in response to a drop in the DC output voltage $V_{OUT}$. As a result, the ON period of the switching device Q1 becomes large, and the output of the boosting chopper 4 rises. Therefore, since a drop in the output voltage $V_{out}$ can be prevented by reducing the change speed of the oscillation wave, responsiveness in case where a drop in the output voltage $V_{out}$ is prevented can be increased.

[5. Variation] Note that, in the above-described embodiments, although it has been described that an AC power supply 2 and a full-wave rectifying circuit 3 are included in the power supply device 1, at least one of those may not be included in the power supply device 1 and may be externally connected to the power supply device 1.

In addition, although it has been described that the power supply control device 5 includes a low voltage malfunction prevention unit 51, an oscillator 52, an error amplifier 54, a level shift unit 55, a trigger unit 57, a pull-up control unit 60, an overvoltage detection unit 61, a light load state detection unit 62, and a pull-down control unit 63, the power supply control device 5 may not include at least one of those.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 power supply device; 2 AC power supply; 3 full-wave rectifying circuit; 4 boosting chopper; 5 power supply control device; 7 voltage error detection compensation circuit; 51 low voltage malfunction prevention unit; 51a comparator; 52 oscillator; 53 voltage acquisition unit; 54 error amplifier; 55 level shift unit; 56 overcurrent detection unit; 57 trigger unit; 57a filter; 57b comparator; 57c mask circuit; 57d delay circuit; 58 switch control unit; 58a pulse width modulation comparator; 58b OR gate; 58c RS flip flop; 58d AND gate; 58e driver; 58f restart timer; 58g OR gate; 58h one-shot circuit; 59 oscillation control unit; 59a current output amplifier; 60 pull-up control unit; 60a comparator; 60b RS flip flop; 60c OR gate; 60d P-channel MOSFET 60d; 61 overvoltage detection unit; 62 light load state detection unit; 62a comparator; 63 pull-down control unit; 63a OR gate; 63b RS flip flop; 63c AND gate; 63d OR gate; 63e N-channel MOSFET; 63f pull-down resistor; 63g timer; 70 RC phase compensation circuit; 520 charge and discharge circuit; 521 current source; 522 P-channel MOSFET; 523 N-channel MOSFET; 524 comparator; C1 capacitor; C71 capacitor; C700 capacitor; D1 diode; Q1 switching device; R1 voltage dividing resistor; R2 voltage dividing resistor; R700 resistor

What is claimed is:

1. A power supply control device comprising:
a switch control unit for controlling an ON/OFF state of a switching device of a boosting chopper using an oscillation wave;
a voltage acquisition unit for acquiring DC output voltage corresponding to an output of the boosting chopper;
an oscillation control unit for reducing a change speed of the oscillation wave during at least a part of a period during which the switching device is in an ON state, in response to a drop in the DC output voltage; and
an operation control unit for maintaining a current output amplifier of the oscillation control unit in an enabled state in response to the DC output voltage exceeding a first threshold voltage.

2. The power supply control device according to claim 1, wherein
the oscillation control unit gradually decreases a change speed of the oscillation wave during at least a part of a period during which the switching device is in an ON state, as the DC output voltage drops.

3. The power supply control device according to claim 2, wherein
the switch control unit controls an ON/OFF state of the switching device using a ramp wave as the oscillation wave, and
the oscillation control unit reduces an inclination of the ramp wave during at least a part of a period during which the switching device is in an ON state, in response to a drop in the DC output voltage.

4. The power supply control device according to claim 1, further comprising an oscillator for generating the oscillation wave, the oscillator comprising:
a capacitor; and
a charge and discharge circuit for charging and discharging the capacitor,
wherein the oscillation control unit changes a predetermined current for changing an amount of electrical charge in the capacitor, the current output amplifier outputting the predetermined current, in response to the drop in the DC output voltage.

5. The power supply control device according to claim 4, wherein the oscillation control unit comprises the current output amplifier for changing the predetermined current corresponding to a difference between a reference voltage and a detection voltage obtained by detecting the DC output voltage.

6. The power supply control device according to claim 5, wherein the current output amplifier changes the predetermined current that varies according to the size of the difference between the reference voltage and the detection voltage.

7. The power supply control device according to claim 6, wherein the current output amplifier does not change the charge current in case where the detection voltage is equal to or higher than the reference voltage, and reduces a current that varies according to the size of a difference between the reference voltage and the detection voltage from the charge current in case where the detection voltage is lower than the reference voltage.

8. The power supply control device according to claim 5, wherein the current output amplifier provides hysteresis between the reference voltage used in case where the detection voltage is equal to or higher than the reference voltage and the reference voltage used in case where the detection voltage is lower than the reference voltage.

9. The power supply control device according to claim 1, further comprising a trigger unit for switching the switching device to an ON state in response to a current flowing to the boosting chopper becoming lower than the reference current.

10. The power supply control device according to claim 1, further comprising a low voltage malfunction prevention unit which sets the current output amplifier in a disable state in response to a power supply voltage of the power supply control device being lower than a second threshold voltage.

11. A power supply control device comprising:
a switch control unit for controlling an ON/OFF state of a switching device of a boosting chopper using an oscillation wave;
a voltage acquisition unit for acquiring DC output voltage corresponding to an output of the boosting chopper; and
an oscillation control unit for reducing a change speed of the oscillation wave during at least a part of a period during which the switching device is in an ON state, in response to a drop in the DC output voltage, wherein
the oscillation control unit keeps the change speed constant when the voltage acquisition unit detects the DC output voltage being larger than a first threshold voltage, and
the oscillation control unit changes the change speed corresponding to a difference between the DC output voltage and a predetermined voltage when the voltage acquisition unit detects the DC output voltage being smaller than the first threshold voltage.

12. The power supply control device according to claim 11, wherein
the change speed varies according to a size of the difference between the predetermined voltage and the DC output voltage.

13. The power supply control device according to claim 11, further comprising a trigger unit for switching the switching device to an ON state in response to a current flowing to the boosting chopper becoming lower than a reference current.

14. The power supply control device according to claim 12, wherein
the switch control unit controls an ON/OFF state of the switching device using a ramp wave as the oscillation wave, and
the oscillation control unit reduces an inclination of the ramp wave while the switching device is in an ON state when the voltage acquisition unit detects the DC output voltage is smaller than the first threshold voltage.

15. A power supply control device comprising:
a switch control unit for controlling an ON/OFF state of a switching device of a boosting chopper using an oscillation wave;
an oscillator for generating the oscillation wave;
a voltage acquisition unit for acquiring a DC output voltage corresponding to an output of the boosting chopper; and
an oscillation control unit for reducing a change speed of the oscillation wave during at least a part of a period during which the switching device is in an ON state, in response to a drop in the DC output voltage, wherein
the oscillator comprises:
a capacitor; and
a charge and discharge circuit for charging and discharging the capacitor,
wherein the oscillation control unit changes a predetermined current for changing an amount of electrical charge in the capacitor, in response to the drop in the DC output voltage, and
the oscillation control unit comprises a current output amplifier for changing the predetermined current corresponding to a difference between a reference voltage and a detection voltage obtained by detecting the DC output voltage.

16. The power supply control device according to claim 15, further comprising a trigger unit for switching the switching device to an ON state in response to a current flowing to the boosting chopper becoming lower than a reference current.

17. The power supply control device according to claim 15, wherein
the switch control unit controls an ON/OFF state of the switching device using a ramp wave as the oscillation wave, and
the oscillation control unit reduces an inclination of the ramp wave while the switching device is in an ON state, in response to a drop in the DC output voltage.

* * * * *